United States Patent
Rukes

(10) Patent No.: US 8,711,275 B2
(45) Date of Patent: Apr. 29, 2014

(54) ESTIMATING OPTICAL CHARACTERISTICS OF A CAMERA COMPONENT USING SHARPNESS SWEEP DATA

(75) Inventor: Jason R. Rukes, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 331 days.

(21) Appl. No.: 13/149,580

(22) Filed: May 31, 2011

(65) Prior Publication Data
US 2012/0307089 A1    Dec. 6, 2012

(51) Int. Cl.
*H04N 5/217*    (2011.01)
*G03B 13/00*    (2006.01)
*H04N 5/232*    (2006.01)

(52) U.S. Cl.
USPC .................. 348/351; 348/241; 348/353

(58) Field of Classification Search
USPC .......... 348/187–188, 241, 242, 345, 351, 353
See application file for complete search history.

(56) References Cited

U.S. PATENT DOCUMENTS

| | | | |
|---|---|---|---|
| 4,829,331 A | 5/1989 | Aihara | |
| 6,359,650 B1 * | 3/2002 | Murakami | 348/333.04 |
| 6,463,214 B1 | 10/2002 | Nakata | |
| 7,403,229 B2 | 7/2008 | Knoedgen et al. | |
| 7,518,652 B2 * | 4/2009 | Olson et al. | 348/351 |
| 7,817,205 B2 * | 10/2010 | Schulte et al. | 348/360 |
| 7,920,172 B2 * | 4/2011 | Chanas et al. | 348/222.1 |
| 2002/0080242 A1 * | 6/2002 | Takahashi et al. | 348/208 |
| 2004/0165090 A1 * | 8/2004 | Ning | 348/272 |
| 2004/0189812 A1 | 9/2004 | Gustavsson et al. | |
| 2005/0162517 A1 | 7/2005 | Fujihara et al. | |
| 2007/0041721 A1 | 2/2007 | Ito et al. | |
| 2007/0076981 A1 | 4/2007 | Ojanen | |
| 2007/0115429 A1 | 5/2007 | Divo | |
| 2007/0115457 A1 | 5/2007 | Matsuzawa et al. | |
| 2008/0316470 A1 | 12/2008 | Lei | |
| 2010/0295987 A1 | 11/2010 | Berge | |

OTHER PUBLICATIONS

Chen, Chun-Jen, et al., "Note: A Multifunction Lens Test System for Imaging Quality Evaluation", Review of Scientific Instruments vol. 81, (2010), 2010 American Institute of Physics, (Received Jul. 23, 2009; Accepted Dec. 7, 2009; published online Jan. 15, 2010), (pp. 016105-1-016105-3).

(Continued)

Primary Examiner — Daniel M Pasiewicz
(74) Attorney, Agent, or Firm — Blakely, Sokoloff, Taylor & Zafman LLP

(57) ABSTRACT

The sharpness sweep of a camera lens is performed while capturing several digital images of an object through the lens. The lens is swept in accordance with a range of distance-representing values. The images are analyzed to calculate a respective sharpness variable for each of several different regions of interest. For each region of interest, a peak value of the sharpness variable is found, as well as the distance-representing value associated with the peak. The pixel coordinates of each region of interest are converted into a pair of distance coordinates, which become part of a triple that is created for the region of interest and that also includes the associated distance-representing value. A surface to fit the triples is estimated, and a measure of the optical characteristic is computed using the estimated surface. Optical characteristics that may be estimated in this manner include tilt and curvature of field. Other embodiments are also described and claimed.

23 Claims, 12 Drawing Sheets

(56) References Cited

OTHER PUBLICATIONS

Dahl, Michael, et al., "Ultra-Fast MTF Test for High-Volume Production of CMOS Imaging Cameras", Presented at SPIE International Symposium on Optical Science and Technology, Aug. 3-8, 2003, San Diego, CA, USA, (8 pages).

Lee, Sang H., et al., "Image Quality Evaluation and Tolerance Analysis for Camera Lenses with Diffractive Element", Journal of the Optical Society of Korea, vol. 10, No. 3, Sep. 2006, (pp. 105-111).

Simon, Eric, "A Liquid Lens with Electro-Optical Focus and Tilt Control", SPIE, Newsroom, 10.1117/2.1201101.003491, © 2011 SPIE, (3 pages).

\* cited by examiner

ESTIMATING OPTICAL CHARACTERISTICS OF A CAMERA COMPONENT USING SHARPNESS SWEEP DATA

BACKGROUND

The ability of a camera to produce a photograph that faithfully depicts a scene is governed in large part by its optical performance. There are several technical variables that can be used to evaluate optical performance based on the quality of the photograph or picture. For instance, there are systems that can measure the sharpness of the photograph. Sharpness is also monitored during an autofocus process in which sharpness values are calculated over a number of image captures, as the distance between a camera lens and the plane of an image sensor is changed or "swept". This may be referred to as sharpness sweep data. The autofocus process attempts to find the optimum location of the lens (e.g., its distance to the sensor) that yields the sharpest captured image. The actual sharpness capability of a camera typically varies in different parts of the image sensor array, due to the imperfect physical characteristics of the lens. For instance, the center of a captured image is typically sharper than the corner areas. Another optical characteristic that is often evaluated is distortion, that is whether a geometric shape in an image has been distorted (e.g., where a straight line becomes curved). Distortion may also be position dependent over the sensor area of the image sensor.

Several measurements of the optical characteristics of a camera component such as a lens are often performed during manufacture testing, to ensure that the specimens released to the end user are within a given performance specification. One characteristic that is tested is that of optical tilt. See FIG. 2 in which a portion of an ideal camera is depicted where the lens and sensor have no relative optical tilt, while FIG. 1 shows (in a rather exaggerated way) the presence of a small amount of tilt, where the lateral lens axis shown is not parallel to the lateral sensor axis. The latter leads to malformation of the optical image of the scene on the sensor array, which may result in a certain amount of blur or defocus in the captured image. Techniques for measuring the optical tilt, and then using it to judge whether or not a lens or camera module is a satisfactory specimen, are available and can be used during high volume manufacture testing of camera modules and camera lenses by themselves. Such techniques, however, are quite complex. In addition to alignment with a test target pattern, high precision mechanical components including a laser light source and mirrors, together with the needed automatic test equipment, are required. For low volume manufacturing of larger lenses such as those used in professional digital SLR cameras, such techniques may be adequate. However, they may not be suitable for high volume manufacturing of camera modules and lenses that are used in small, low cost, consumer electronic, multi-function mobile devices, such as smart phones and tablet computers. The lenses used in such devices are relatively small and the resulting photographs that are taken may be more susceptible to variations in optical characteristics. In addition, high volume manufacture testing of such devices may create a large expense when using the conventional testing techniques, due to the sheer volume of lenses and camera modules that need to be tested.

SUMMARY

An embodiment of the invention is a method for estimating optical characteristic of a camera component. A sharpness sweep of a camera lens is performed while capturing, using an image sensor, several digital images of an object through the lens. The lens is swept in accordance with a range of distance-representing values. The digital images are analyzed to calculate a respective sharpness variable for each of several different regions of interest in the image sensor. For each region of interest, a peak value of the respective sharpness variable is found, as well as the distance-representing value associated with the peak. The pixel coordinates of each region of interest are converted to a pair of distance coordinates, which become part of a triple that is created for the region of interest that also includes the associated distance-representing value. A surface to fit the triples (for the regions of interest) is estimated. A measure of the optical characteristic is computed, e.g. a normal vector to the estimated surface. For instance, where the estimated surface is a plane, the angle of the normal vector is the angle of the plane relative to the x-y plane of the coordinate system. This angle (which may have two components, x-tilt and y-tilt) is the estimated optical tilt of the lens.

The camera lens may be an autofocus lens that includes a lens element, its holder, and an autofocus actuator that may be integrated in the same camera module that contains the image sensor. In one instance, the autofocus lens is swept in accordance with a range of autofocus actuator driver values. For each region of interest, a peak value of the respective sharpness variable and the autofocus actuator driver value associated with the peak is found. The associated driver value may be converted to an associated lens displacement value, which becomes part of the triple together with the converted pixel coordinates of the region of interest.

In one embodiment, the estimated surface that fits the triples is a plane. A number of difference values are then computed, where each difference value is the difference between a point on the plane surface and the associated distance-representing value of a respective region of interest in which the point is located. These computed difference values may then be representative of another optical characteristic, e.g. curvature of the field.

In another embodiment, the optical characteristic estimation process may be used to calibrate an optical image stabilization (OIS) mechanism of a camera, as follows. The optical characteristic estimation process is executed at each of several different tilt angles that can be produced by sweeping a control or input variable of the OIS mechanism. This may be repeated for several different specimens of the same OIS lens design, to generate statistical data that can then be analyzed to define an expected or characteristic lens tilt angle variable, as a function of the input variable (for the given OIS lens design). Thereafter, a production specimen (device under test, DUT) of the OIS lens design can be calibrated, by adjusting a parameter of its OIS mechanism so that the OIS mechanism (of which the production specimen is a part) will behave more closely like the expected lens tilt angle variable. To verify this adjustment, the DUTs lens tilt angle is computed (using the above described optical characteristic estimation process) at several values of the OIS mechanism's input variable, and these estimated DUT tilt angles are then compared to the expected tilt angle variable; if they are close enough, then the OIS mechanism of the DUT is behaving as expected and hence the calibration is verified.

In another embodiment, the optical characteristic estimation process can be applied during in-the-field use of the OIS mechanism.

In yet another embodiment, the optical characteristic estimation process can be used to enhance an autofocus algorithm, so that the algorithm may become less sensitive to scene detail.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

A method for estimating an optical characteristic is described that may be more efficient from a cost point of view, while providing sufficiently accurate results. The method is suitable for high volume production testing of certain camera components used in relatively small, low cost, consumer electronic multifunction mobile devices, such as smart phones, tablet computers, and notebook or laptop machines. The techniques described here could also be used in place of conventional techniques that may be especially designed for cameras that have larger lenses, such as dedicated consumer electronic and professional grade still and video cameras.

Figure 3:
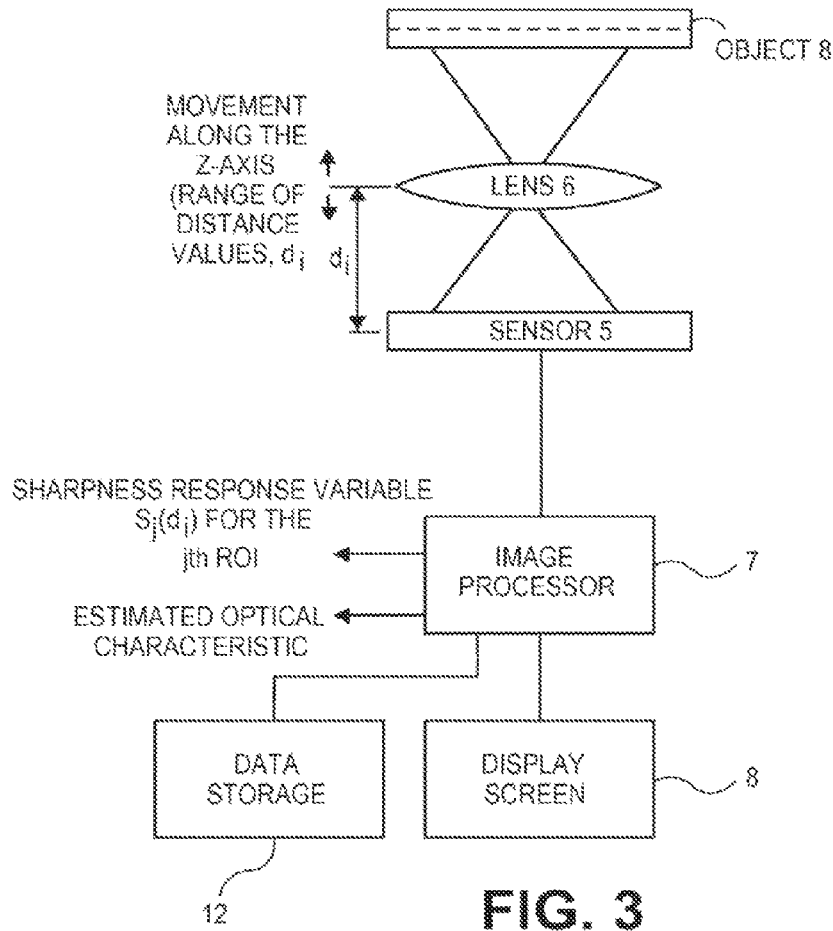
FIG. 3 depicts a system for estimating optical characteristics using sharpness sweep data.
Figure 4:
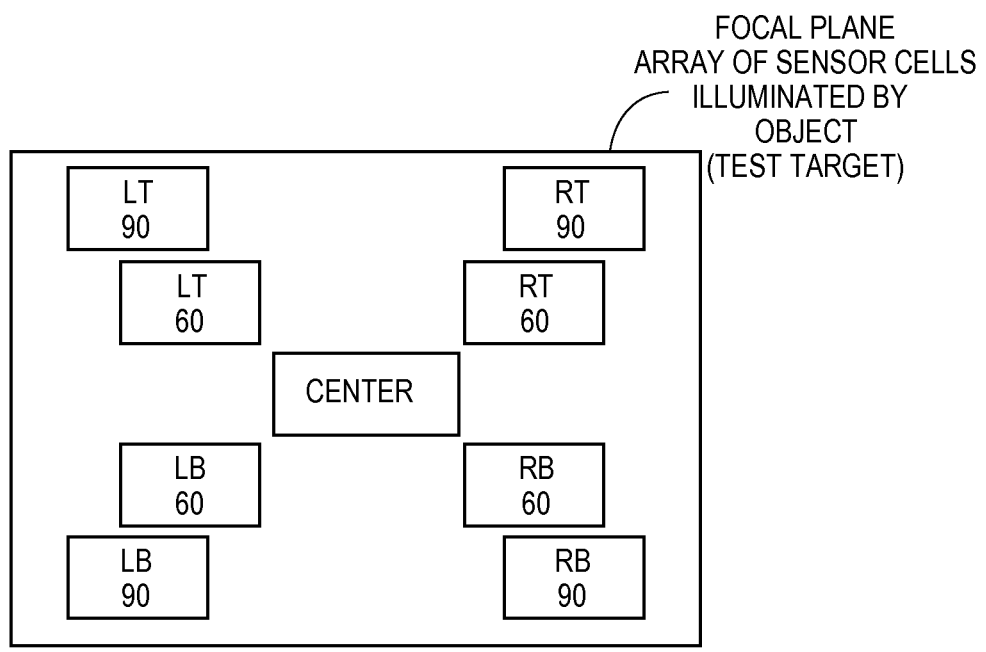
FIG. 4 illustrates an example of the regions of interest in a test target illuminated focal plane array.

FIG. 3 depicts a system for performing the optical characteristic estimation method. The system includes an image processor 7 that will be performing for the most part the digital image processing operations described here. The image processor 7 may be any suitably programmed computer, such as a dedicated test computer, or a programmed processor that is embedded within a host device (of which the camera component being tested is a part). The camera component to be tested has a lens 6 that is positioned in the incident light path of an image sensor 5. The lens 6 and the image sensor 5 may be integrated in a camera module, such as those typically used in consumer electronic mobile devices. Alternatively, the lens 6 may be a separate item, and is being tested while installed in an optical test fixture (the details of which are not shown), for example, during laboratory or manufacture production testing. In any case, an object 8 is needed to provide a set of known test patterns or test patches, where the object is located so as to produce a test pattern image on the focal plane array of sensor cells in the sensor 5. The object 8 may be a flat test pattern that is positioned at a fixed location relative to the lens 6, along the z-axis, and that has several test patches in different locations of its x-y plane, such as center, right top 90% field, right top 60% field, right bottom 60% field, right bottom 90% field, etc.—see FIG. 4. Other test patterns for the object 8 are possible. Other suitable test patterns suitable for evaluating the sharpness of an optical system may be used.

Figure 6:
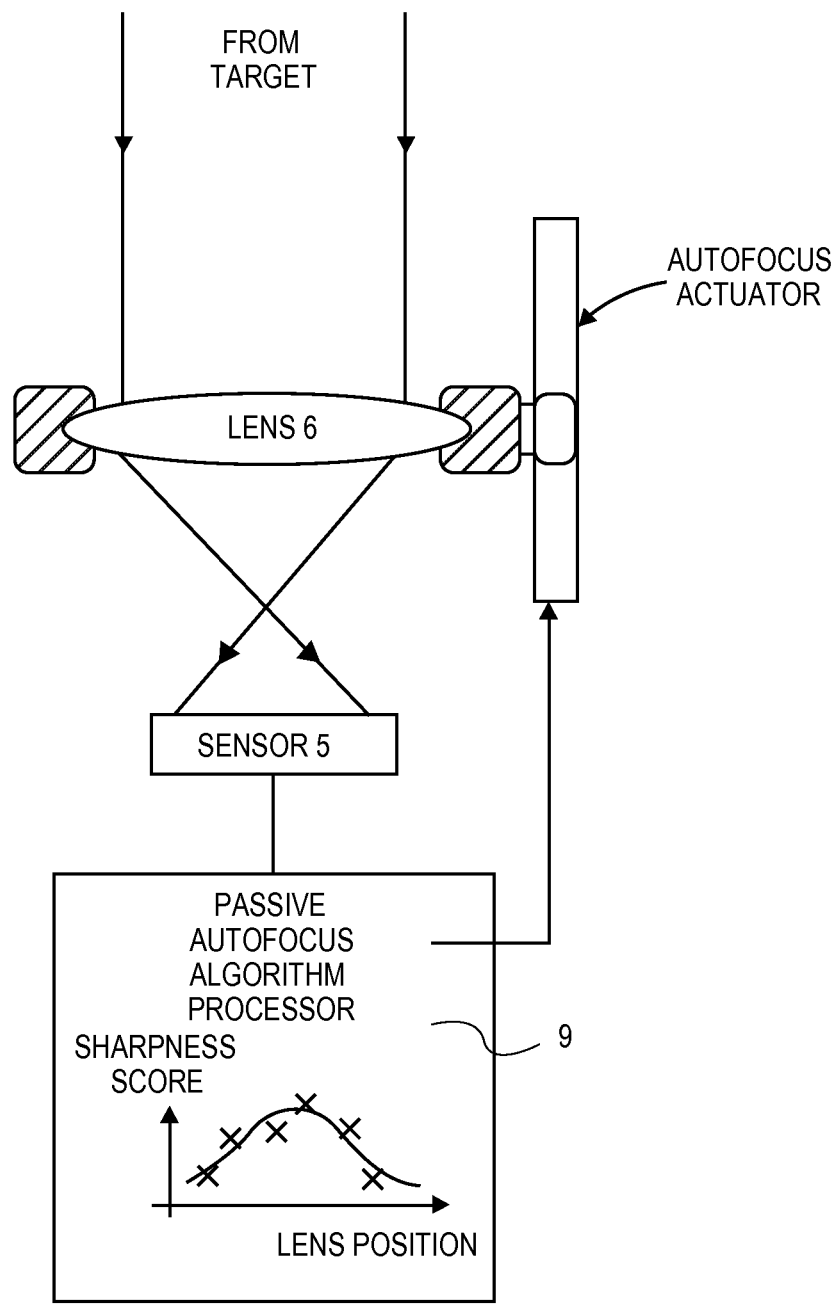
FIG. 6 is a system for estimating the optical characteristics of an autofocus camera lens.

The techniques described here may be applied to a zoom lens (also referred to as a variable field-of-view lens that yields acceptably sharp focus despite different lens positions), a varifocal lens, an autofocus lens, or even a fixed lens. The term lens here refers to a lens system that may have one or more optical elements, including one or more lens elements, filter elements, and apertures. As is typical, the lens element may be manufactured as being installed in a holder or barrel. The holder or barrel may then be installed into a camera module by, for instance, being screwed into position. For a fixed focal length lens, the holder may then be glued or otherwise bonded in place. Thus, once shipped to the consumer, the fixed focal length lens does not exhibit any movement of the holder in what is referred to here as the z-direction or z-axis. This is in contrast to an autofocus or other moveable lens that can be manually, or through a powered actuator such as a voice coil motor (VCM), be moved in the z-direction in order to produce different focal states. See FIG. 6, showing an autofocus actuator that is under control of an autofocus algorithm processor 9. The action of moving the lens 6 relative to either the sensor or the object is referred to here as a sweep of the camera lens.

Figures 1, 2:
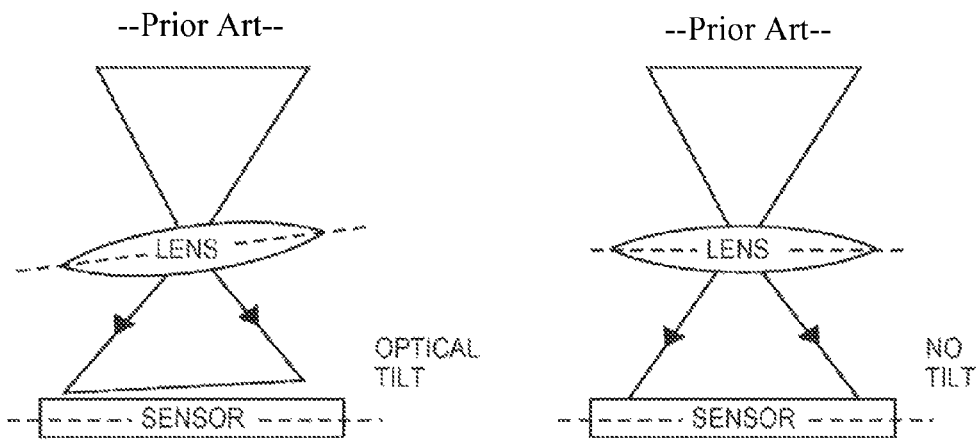
FIG. 1 depicts an optical system with tilt.
FIG. 2 depicts the optical system without any tilt.

As depicted in FIG. 1, the optical characteristic that is being estimated here may be viewed as the tilt of the lens 6 relative to the image sensor 5, which may, in effect, be the same as the tilt of the image sensor relative to the lens. In one embodiment, the optical tilt may be defined as being relative to a flat sensor and a flat target (object 8—see FIG. 3). In another embodiment, the optical tilt may be defined in the presence of a non-flat or curved target, and a flat sensor.

Another embodiment of the invention is described below which estimates another optical characteristic, namely curvature of field of the camera lens. In that case, it is understood that, in practice, a lens is typically designed in order to yield a flat image, because the image sensor is typically flat; however, due to practical limitations of manufacturing, the lens 6 still exhibits a curvature of field in that the image it produces is not quite flat but slightly curved, thereby resulting in a noticeable amount of blur or defocus in the pictures. See the discussion below in connection with FIGS. 13 and 14, which describes how to estimate the curvature of field.

In accordance with an embodiment of the invention, a method for estimating optical tilt may proceed as follows. Referring to the example system of FIG. 3, the image processor 7 is used to perform a sharpness sweep of the camera lens 6. The sharpness sweep may be performed by moving the lens 6 over a range of distance-representing values, $d_i$. The nature of the distance-representing value $d_i$ may depend upon the type of camera lens being tested. For instance, for an autofocus lens, the distance-representing values $d_i$ can be autofocus actuator driver values; these are in essence input commands for the actuator to move the attached lens to respective positions, e.g. integer, digital to analog converter (dac) values for a VCM-based actuator. In contrast, for a fixed focal length lens, the distance-representing values may be directly measured lens-to-sensor distances, where these may be directly or physically measured in the laboratory for the particular test system depicted in FIG. 3. (Note that for a fixed focal length lens, sufficient movement for the sweep could be achieved while the lens barrel is being manually screwed into place on its camera frame). The distance-representing values $d_i$ could also be the computed focal length values of the lens 6; these can also be readily measured in a laboratory setting by the developer or manufacturer of the lens 6. Other forms of distance-representing values may be used.

To perform the sharpness sweep, or in other words to sweep across a focus range of the lens, the test fixture could be designed to allow the sensor 5 to be moved relative to the lens 6 and the object 8 (along the z-directed optical axis). Such a technique may be suitable for when the lens 6 is a fixed focus lens that cannot be moved along the z-axis. As an alternative, the sweep across the focus range may be achieved by moving the object 8 relative to the lens 6 and the sensor 5. This may be suitable if the object 8 can be easily and accurately moved in a controlled manner, such as in a laboratory setting. As yet another alternative, which is depicted in FIG. 3, the sweep of the focus range is achieved by moving the lens 6 relative to the object 8 and the sensor 5. This technique may be suitable when the lens 6 is a moveable lens such as an autofocus lens (see FIG. 6) or a zoom lens.

Figure 5:
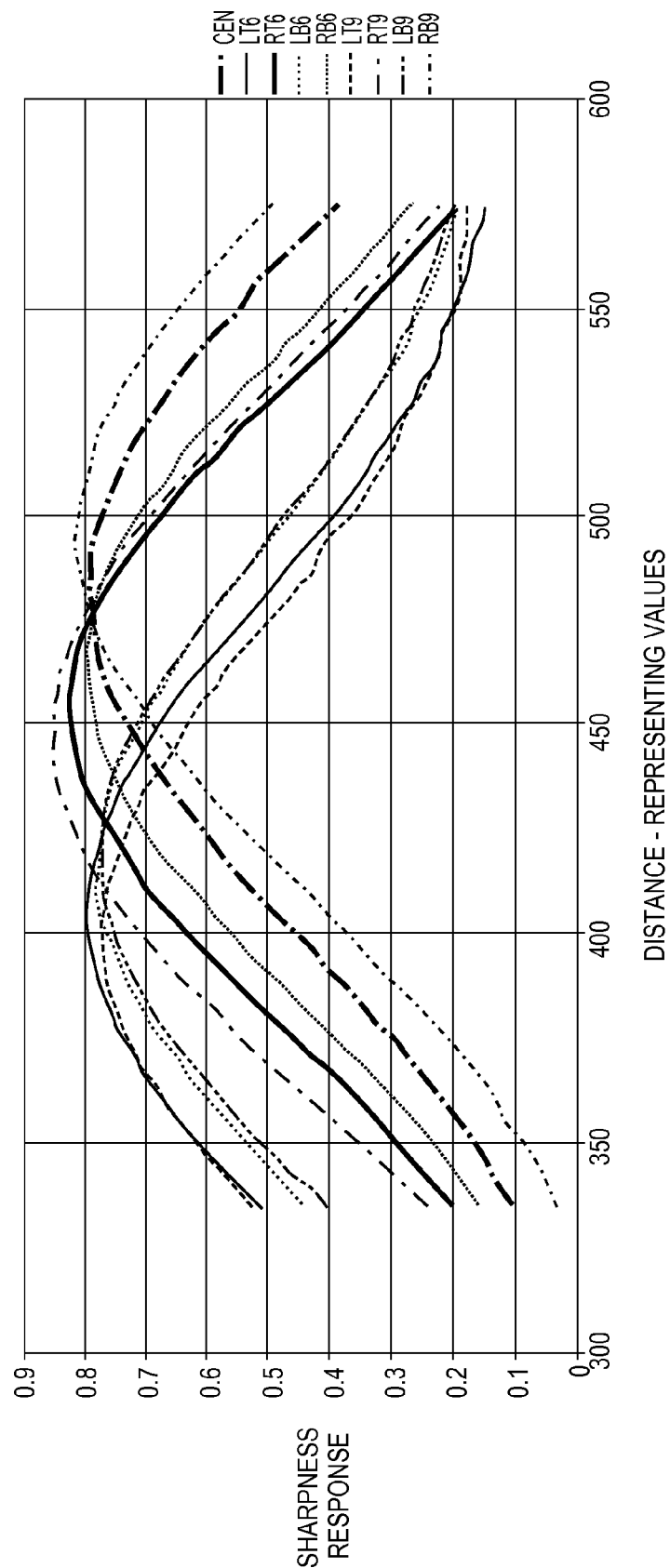
FIG. 5 is a plot of calculated sharpness response values as a function of distance-representing values.

The optical characteristic estimation process continues with one or more digital images being captured by the image sensor 5 at each $d_i$ (e.g., at each position of a moveable lens 6). The images are then analyzed to calculate a respective sharpness variable for each of several different regions of interest in the image sensor's focal plane array of sensor cells (see FIG. 4 for an example set of nine regions of interest). The sharpness variable S may be any conventional measure of the performance of a lens, such as a spatial frequency ratio, SFR, or modulation transfer function, MTF. Each sharpness variable $S_j$ is computed using the pixel data of its respective (jth) region of interest. In one embodiment, the pixel data of a single digital image or frame that is captured by the sensor 5 (at the ith position of the lens 6) is used to calculate all of the $S_j$ at that lens position; in another embodiment, the pixel data of more than one frame (e.g., as part of a video capture sequence) are used to calculate the $S_j$. FIG. 5 shows the results of such calculations, plotting the sharpness variable as a function of the distance-representing values, where the latter in this case are actuator driver values. There are nine curves that have been plotted here corresponding to the nine regions of interest depicted in FIG. 4. It is clear that as expected, the camera lens in this case is not perfect, and so its sharpness peaks are widely separated from each other in the horizontal axis. A perfectly aligned camera lens could result in peak values that are very close to each other, i.e. falling within a very narrow range of distance-representing values.

Figure 7:
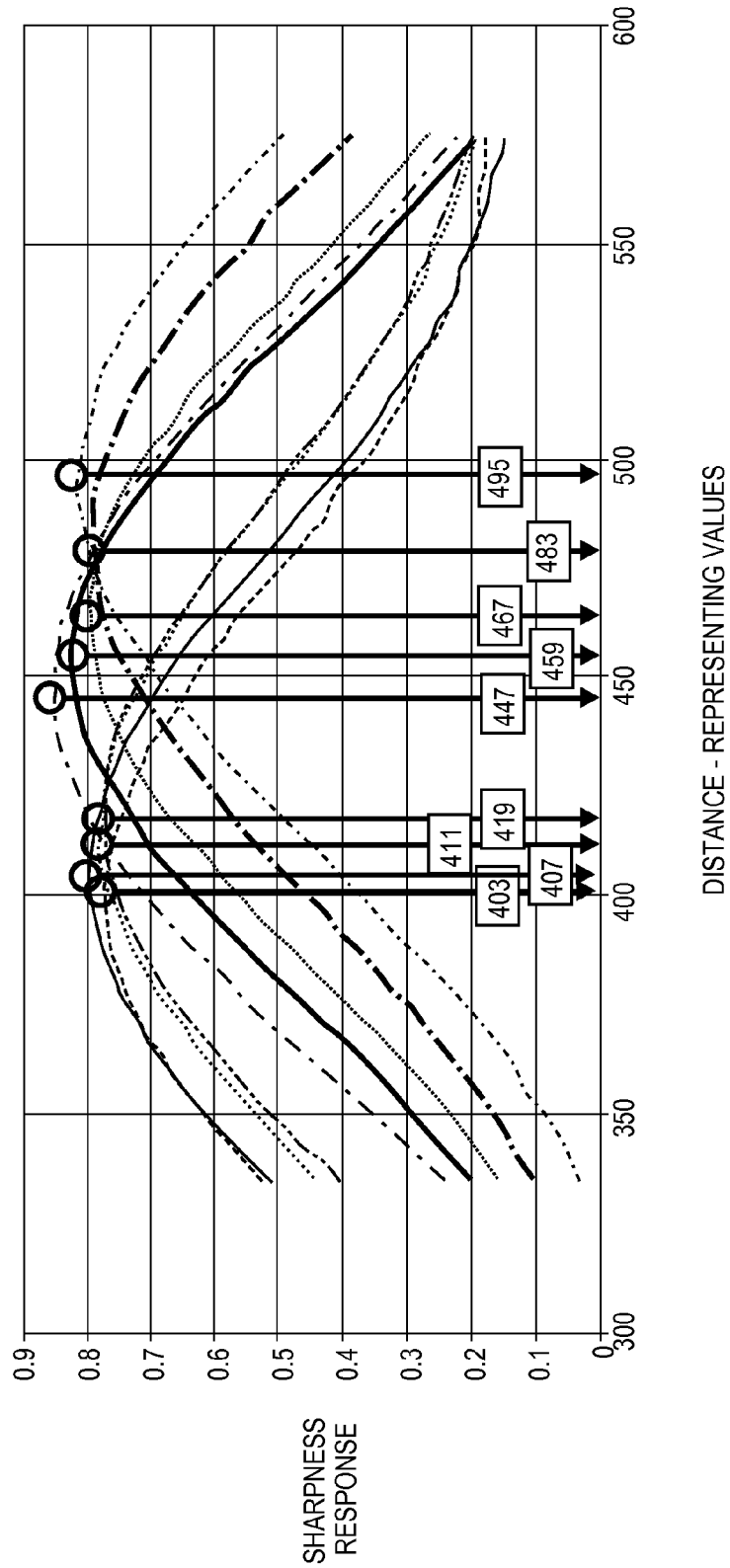
FIG. 7 shows the discovery of the peak values in the sharpness curves of FIG. 5.
Figure 8:
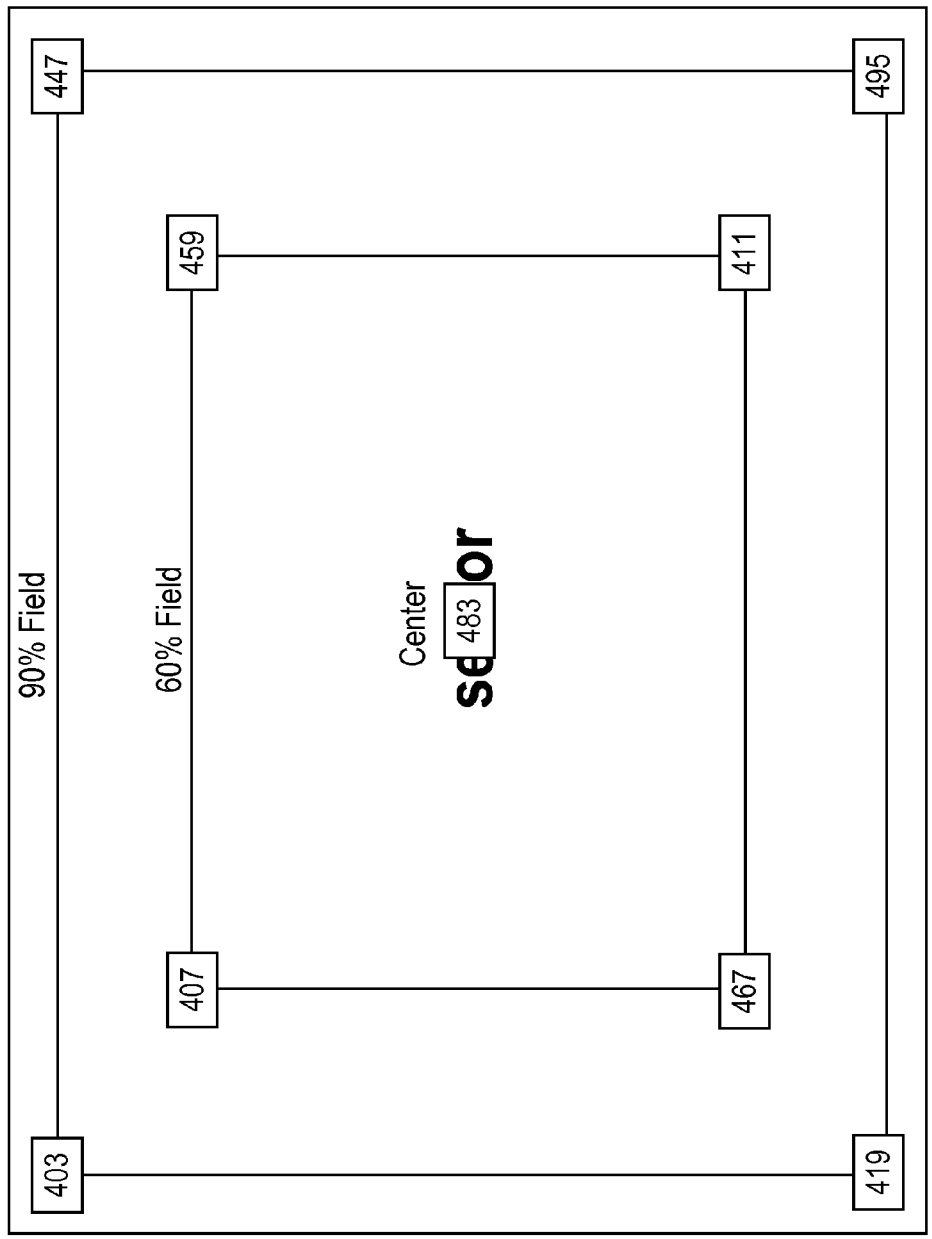
FIG. 8 shows the regions of interest and their respective peak values.

The sharpness variables (and their data depicted in FIG. 5) are then analyzed such that for each of the regions of interest, a peak value of the respective sharpness variable, and the distance-representing value associated with the peak value, are found. This operation is depicted in FIG. 7, where for each sharpness curve, a peak value is found, together with the associated distance-representing value that yields the peak sharpness value. The nine associated distance-representing values that correspond to the nine sharpness peaks are mapped to their regions of interest as depicted in FIG. 8.

Figure 9:
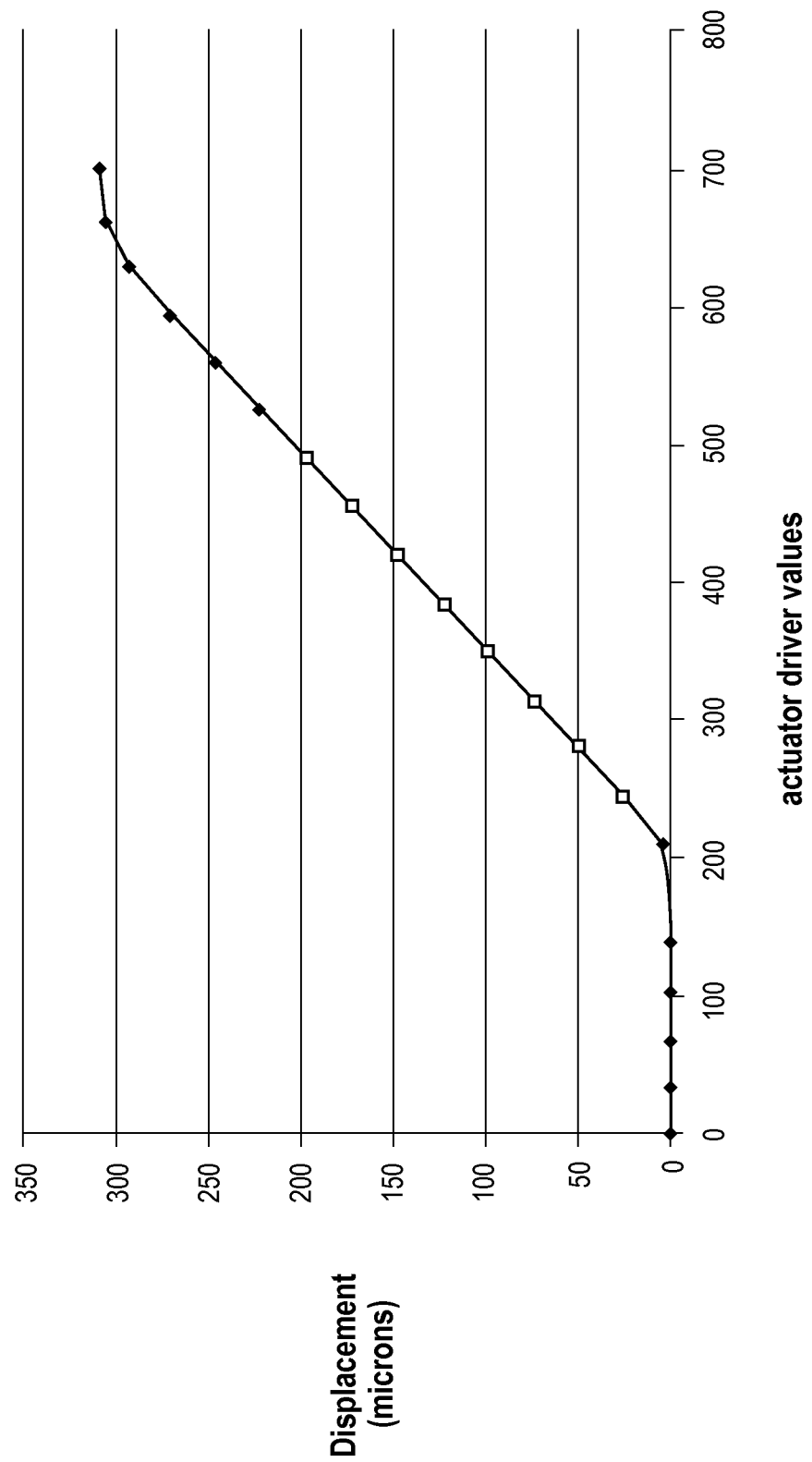
FIG. 9 is a plot of optical system displacement or distance, versus actuator driver values for converting peak distance-representing values into displacement values.

To reiterate, the concept of "distance-representing value" here is used to encompass both an actual distance value, which is measured in units of distance or displacement, such as microns), as well as a non-distance value (that nevertheless represents camera lens distance). Thus, in the example given in FIG. 6, which is a block diagram of part of an autofocus camera, the distance-representing values may be actuator driver values (which are not in units of distance or displacement). In that case, the optical characteristic estimation process would need a conversion operation, to convert such non-distance values into distance values. FIG. 9 depicts an example of how actuator driver values can be converted to lens displacement (in this case, measured in microns). The data points and their best-fit curve shown in FIG. 9 may be measured and computed at the factory where the autofocus lens or camera is being manufactured or assembled. The resulting conversion curve may then be used in the estimation process described here, in instances where the sharpness sweep of the camera lens 6 is initially performed using non-distance values, to obtain the corresponding distance value for each sharpness peak.

Figure 10:
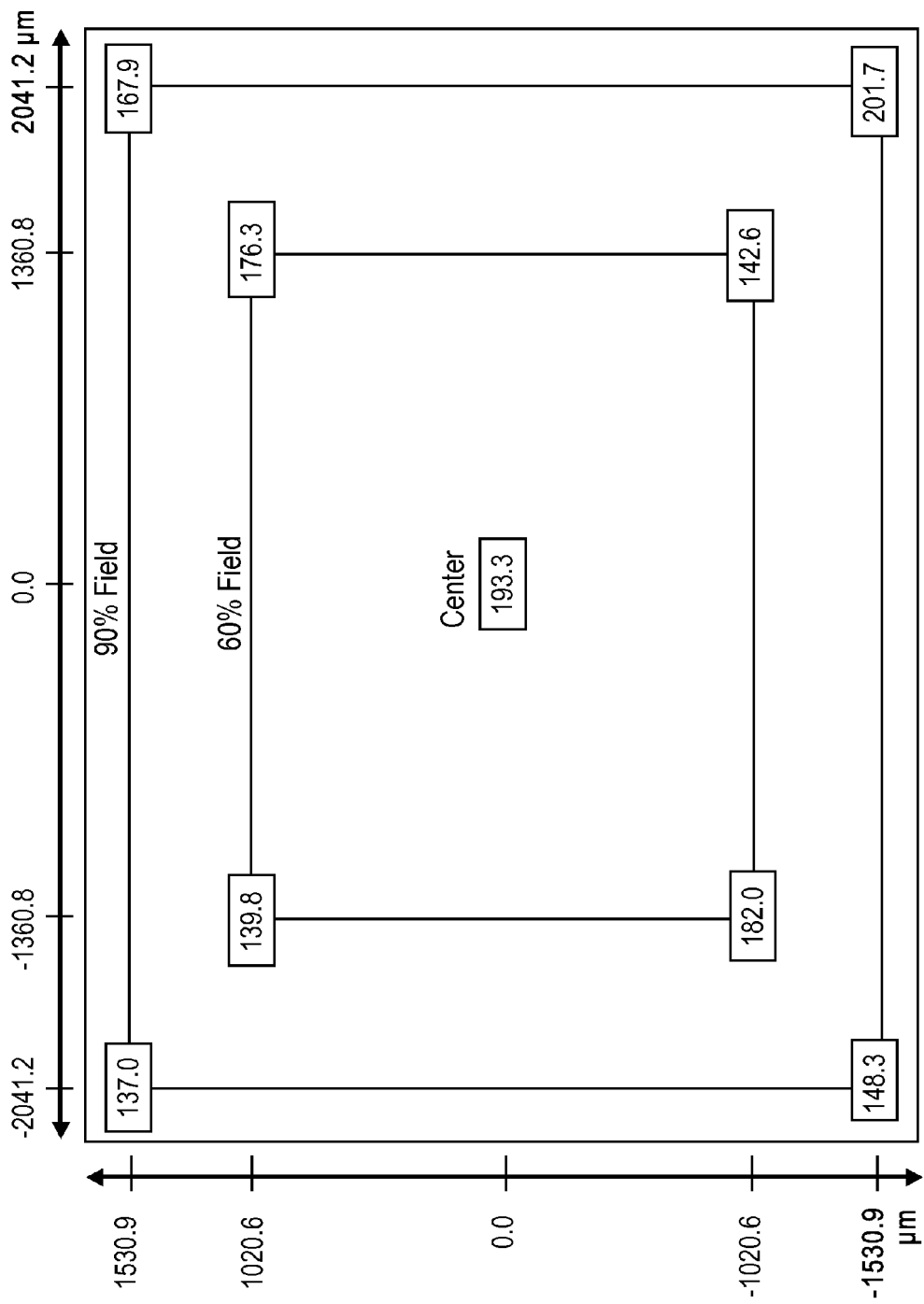
FIG. 10 shows the peak values mapped to their respective regions of interest in the sensor array, overlaid with the distance coordinate axes.

FIG. 10 depicts the sensor focal plane of the sensor 6, overlaid with the converted, distance-representing values. These are associated with the sharpness peaks (see FIG. 7), and may have been converted into units of distance (using for example the best-fit curve of FIG. 9). The sensor focal plane is also overlaid with its horizontal and vertical axes (x and y axes) that are given in units of distance (here, microns). The center of the sensor array may be assigned to the origin (0, 0), for convenience. The combined overlay shown here is used to illustrate how the pixel coordinates of each of the regions of interest (nine in this case) are converted into a pair of distance coordinates (x, y). Following this conversion, a "table of triples" may thus be created. As seen in the example table below, each triple contains the associated distance-representing value (which may have been previously converted into distance units, if not already in distance units), and the pair of distance coordinates (also in distance units) that define the associated region of interest (RoI).

| RoI | X | Y | Z (sharpness peak) |
|---|---|---|---|
| LT_90 | −2041.2 | 1530.9 | 137.0 |
| LT_60 | −1360.8 | 1020.6 | 139.8 |
| RT_60 | 1360.8 | 1020.6 | 176.4 |
| RT_90 | 2041.2 | 1530.9 | 167.9 |
| center | 0.0 | 0.0 | 193.3 |
| LB_90 | −2041.2 | −1530.9 | 148.3 |
| LB_60 | −1360.8 | −1020.6 | 182.0 |
| RB_60 | 1360.8 | −1020.6 | 142.6 |
| RB_90 | 2041.2 | −1530.9 | 201.7 |

In the above table, each computed Z value refers to the z-directed distance or height, between the lens 6 and the focal plane of the sensor, where the focus was "best" at the respective region of interest.

Figure 11:
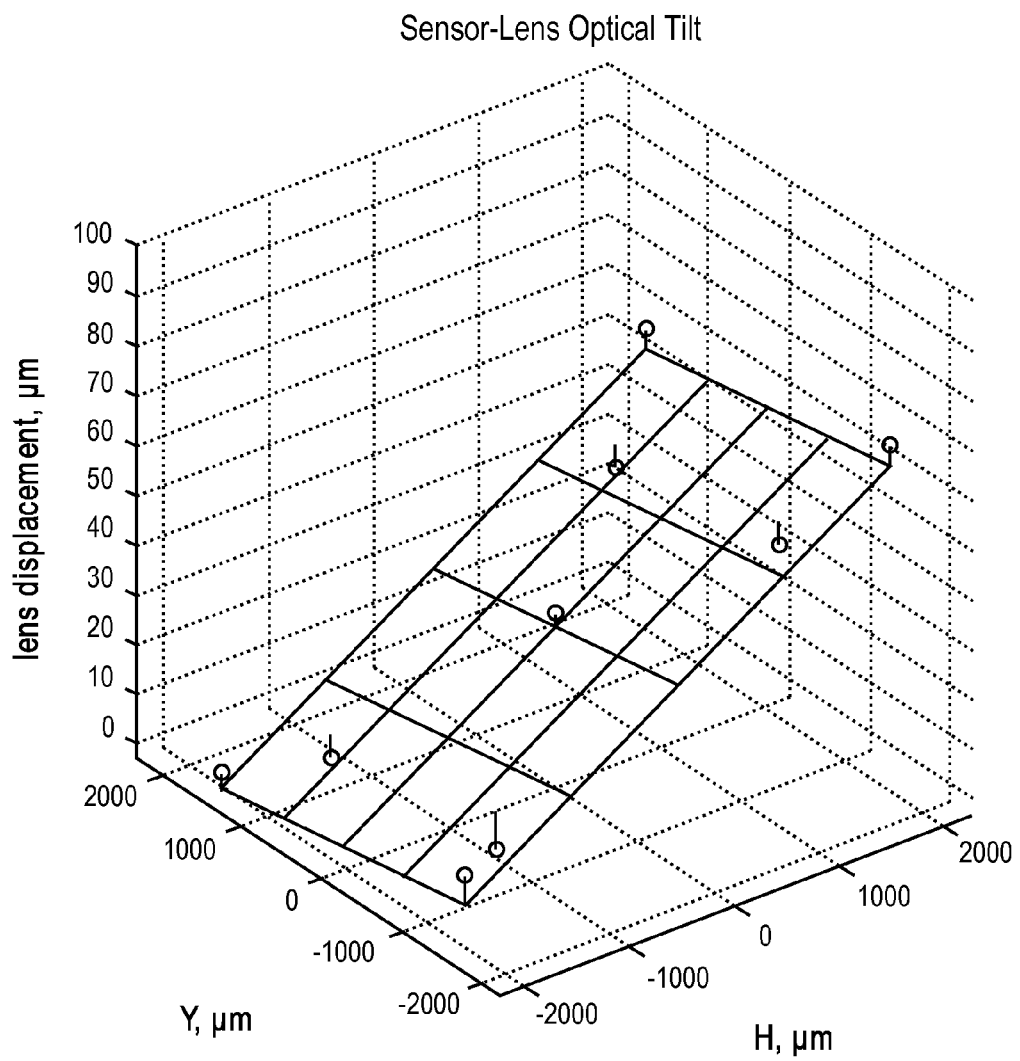
FIG. 11 is a plot of the triples and a calculated best-fit plane surface.
Figure 12:
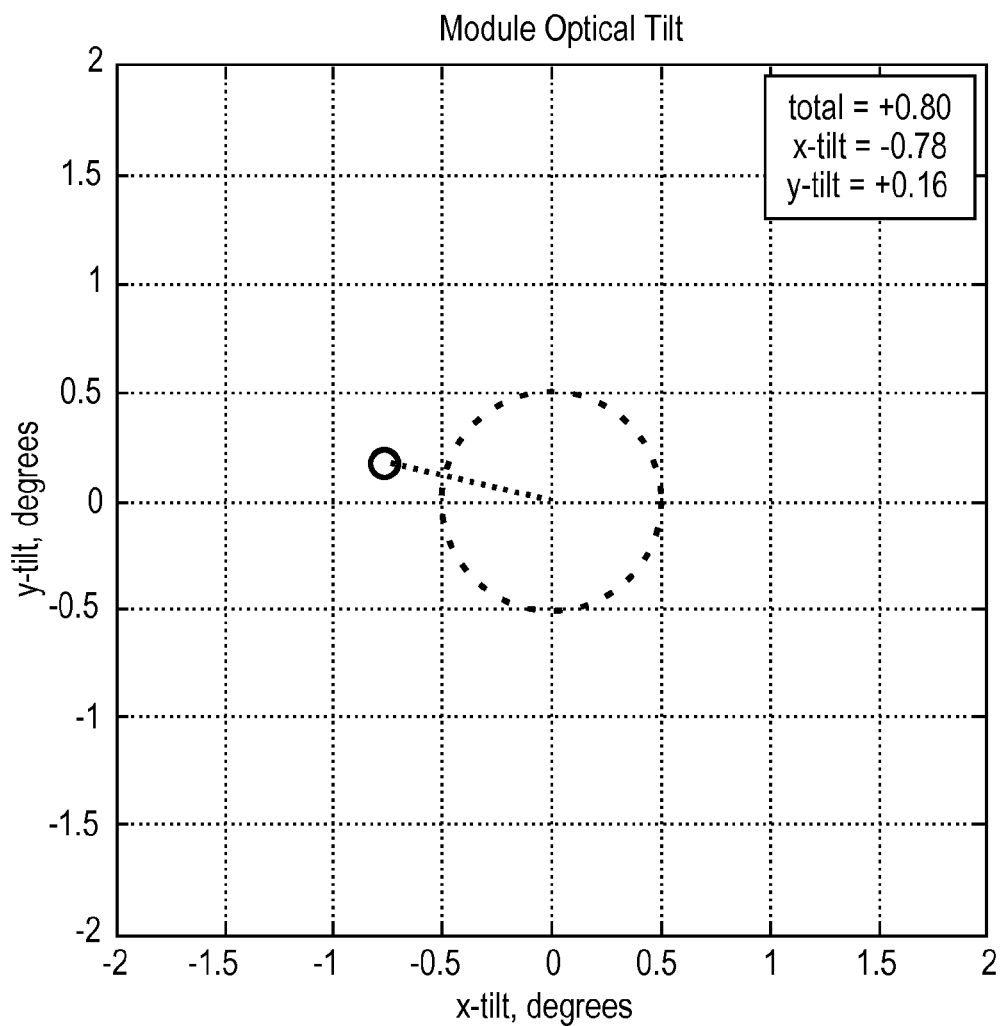
FIG. 12 is a plot of the optical tilt vector derived from the data in FIG. 11.

The estimation process continues with the next operation, namely computing a surface that fits the table of triples. Any suitable surface fitting algorithm may be used, e.g. principal components analysis, PCA, where the first two principal components define a plane and the third is orthogonal to them. FIG. 11 shows the nine data points (triples), and a result of applying a surface-fitting algorithm to find, in this example, a best-fit plane for the nine actual data points. The orientation of the plane yields the estimated tilt of the lens 6. The orientation may be quantified by computing the normal vector to the best-fit plane; this is shown in FIG. 12. In this case, normal vector is tilted in the x-axis by −0.78 degrees, and in the y-axis by +0.16 degrees.

The estimation process described above may be used in production testing of camera lenses and camera modules, to verify that the relevant optical characteristic (here, the vector that is normal to the best-fit surface) computed for each given specimen (device under test, DUT) is within an expected range. This of course may involve one or more comparisons of at least one component of the normal vector to a threshold. A pass or fail indication is then associated with each specimen, based on the comparison. The threshold or expected range may be defined based on taking the average of several instances of the relevant optical characteristic (computed for a number of specimens).

Another embodiment of the invention is a process that may yield an estimate of the curvature of field of the camera lens 6. While a camera lens is typically designed to have a flat field, the practical reality is that its frequency response rolls off, i.e. the image formed is less sharp, near the edges of the field where the optical image is formed. This is referred to as the curvature of the field or field curvature. The curvature may be concave, convex, or a combination (wavy). The process here calculates the field curvature as a "delta" or difference, relative to a plane that has been estimated to fit the table of triples. Recall that each triple contains three values: the associated lens displacement value and a pair of distance coordinates for its respective region of interest. Also, the orientation of the plane may represent the optical tilt of the lens. This allows the concept of tilt to be separated from the field curvature, by realizing that the deviation or delta between the plane and the lens displacement values (of the triples) may define points on the field curvature.

A process for estimating the field curvature may thus encompass the same sharpness sweep, sharpness peak detection, and table of triples described above. The process would then compute a plane surface to fit the triples, followed by computing a number of difference values, wherein each difference value is the difference between the plane surface and the associated distance value of a respective one of the regions of interest. These difference values may then be used to represent the field curvature of the camera lens.

Figure 13:
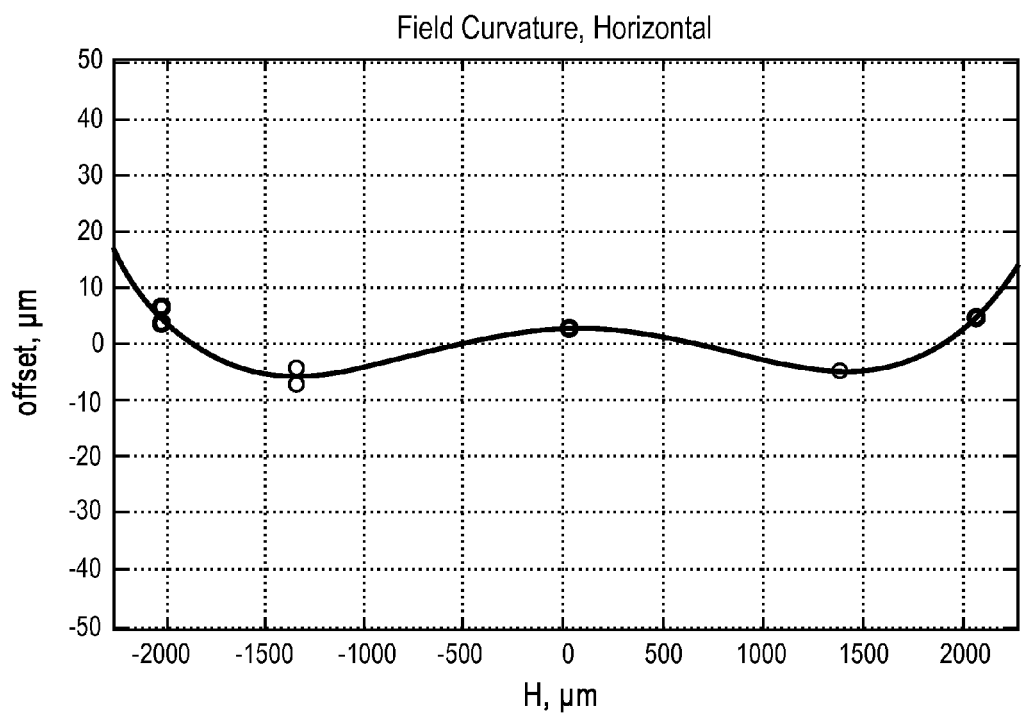
FIG. 13 is a plot of field curvature in a horizontal axis derived from data in FIG. 11.
Figure 14:
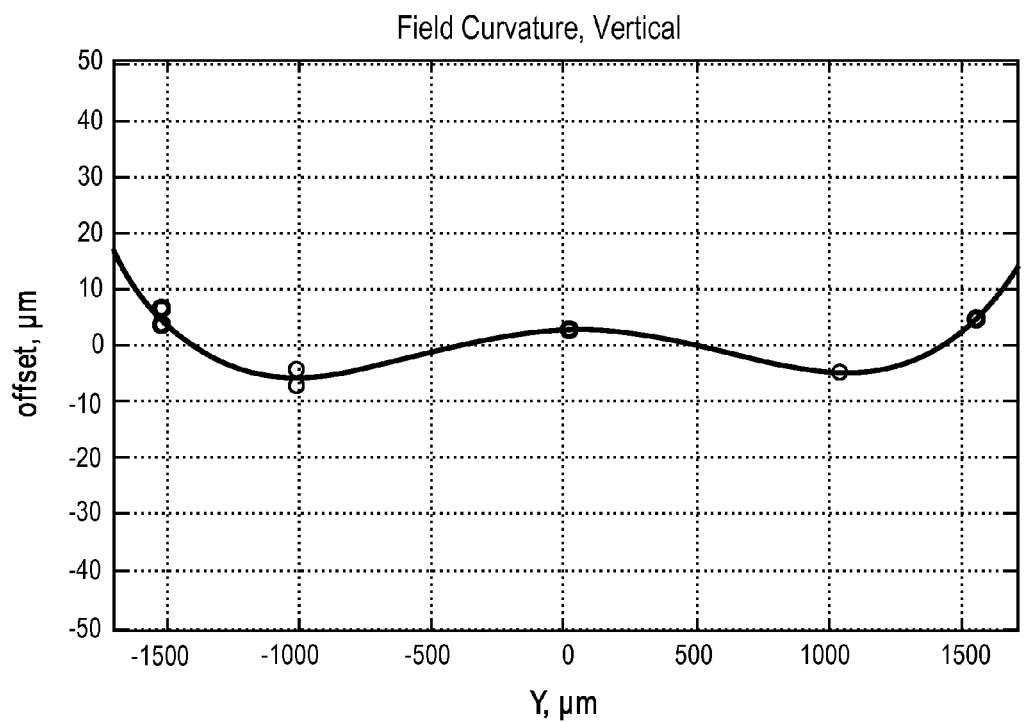
FIG. 14 is a plot of field curvature in a vertical axis derived from data in FIG. 11.

FIG. 13 shows a plot of in this example seven points, each being based on a respective one of the difference values, against the x (horizontal) component of the pair of distance coordinates of the respective region of interest (using the table of triples computed above). An "offset curve" has been fitted to these seven points, versus distance along the x-axis (the horizontal or H axis). This curve represents the field curvature of the lens 6, looking at the lens in a direction perpendicular to the horizontal axis. A similar operation may be performed to also plot seven points, each being based on the respective one of the difference values, against the y (vertical) component of the pair of distance coordinates of the region of interest. This can be seen in FIG. 14. The latter curve represents the field curvature of the lens as seen looking at the lens in a direction perpendicular to the vertical axis.

The estimate of the field curvature as computed above may be used to quantify the degree of defocus or blur that can be expected in a given region of interest of the image sensor. As expected, FIG. 13 and FIG. 14 reveal that the lens 6 performs well near the center of the sensor array, but rapidly degrades near the edges. The curves shown in those figures may be used to quantitatively assist in a deblur algorithm that attempts to improve sharpness of a capture image.

Application to Optical Image Stabilization (OIS)

Figure 15:
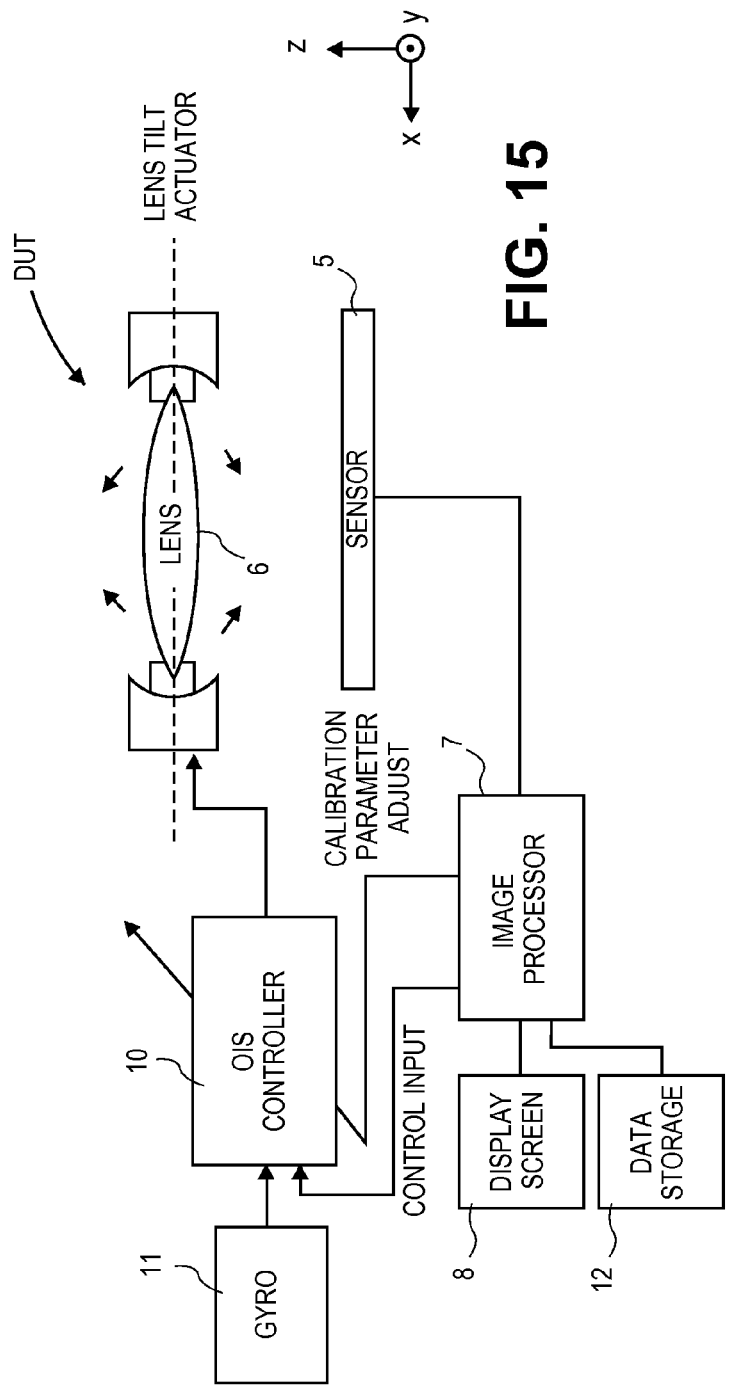
FIG. 15 is a block diagram of a camera having an OIS mechanism that controls the optical tilt between the lens and the image sensor.

In one embodiment, an OIS mechanism that can actively induce a relative tilt between the camera lens and the sensor, to compensate for vibration or movement during image capture, may be calibrated at the factory, using a variation of the optical characteristic estimation process described above. Referring now to FIG. 15, FIG. 15 is a block diagram of a camera having an OIS mechanism that controls the optical tilt between the imaging lens 6 and the image sensor 5. In this example, the lens 6 can be tilted actively by a lens tilt actuator under control of an OIS controller 10. The lens tilt actuator may be any motorized mechanism or other suitable actuator that can tilt the lens, in this case, about the y-axis, tilting the lens 6 above or below the x-y plane. More complex tilt actuators may alternatively be provided, such as one that tilts not only about the y-axis but also about the x-axis. In another embodiment, the tilt actuator is instead coupled to actively tilt the image sensor 5 (relative to the lens 6).

The control signals for commanding the tilt actuator are produced by a conventional OIS controller 10. The latter may be a digital controller whose inputs include an orientation signal from a gyroscope 11 (or other suitable orientation sensor) and a "manual" control variable from an image processor 7. The latter may be a digital processor that has been programmed to perform any desired image processing upon one or more interim images produced by the image sensor 5, so as to result in an enhanced final image (a still shot or part of a video sequence). The final image may then be displayed on the display screen 8 or stored in the non-volatile data storage 12.

Figure 16:
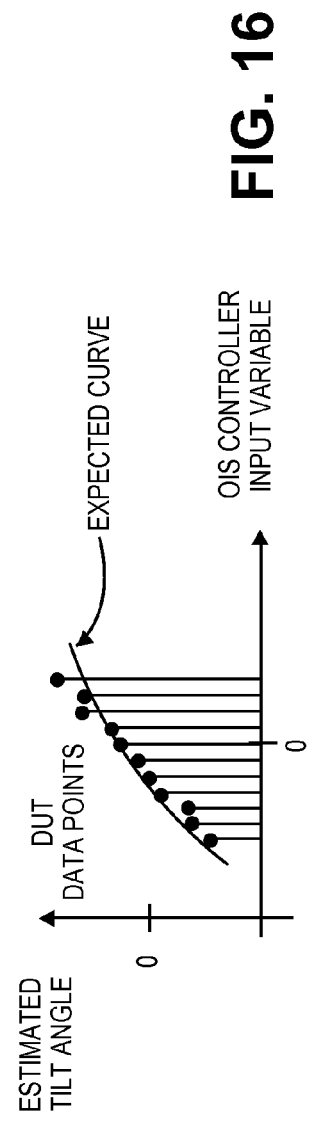
FIG. 16 is a plot of estimated tilt angles versus an OIS input variable.

The OIS mechanism used in FIG. 15 may be calibrated at the factory, using a variation of the optical characteristic estimation process described above. The process may be as follows. First, an optical tilt estimation process can be executed at each of several different tilt angles. These can can be produced by sweeping the manual control variable, at an input of the OIS controller 10. This is repeated for several different specimens (or devices under test, DUTs) that have the same design for the camera lens 6, to generate statistical data—see FIG. 16 which shows an example of plotting such data points versus an OIS controller input variable. Such data are then analyzed to define an "expected" or characteristic lens tilt angle variable as a function of the control input variable (for the given OIS lens design). FIG. 16 depicts this variable as an expected curve, drawn as a "best fit" curve for the data points.

Thereafter, production specimens having the same design of the lens 6 are calibrated by adjusting (e.g., scaling) the gyro and manual control inputs. This may be done by the image processor 7 adjusting one or more calibration parameters of the OIS controller 10. In this manner, a given OIS control input value and the resulting lens tilt (achieved by an OIS lens specimen under test) will match the expected combination of control input value and lens tilt angle. The lens tilt angle of the specimen under test can be computed in the manner described above in connection with FIGS. 1-12. This computed tilt angle may then be compared to the expected tilt angle range or threshold (e.g., the "expected curve" in FIG. 16), to verify the calibration.

In another embodiment, the optical tilt estimation process can be applied during in-the-field use of the OIS mechanism, to correct for small vibrations or movement of the camera relative to an object in the scene whose picture is being taken by a consumer (end-user of the camera).

Application to Autofocus

An optical tilt estimation process as described above can be used to enhance a conventional passive, contrast measurement autofocus algorithm (see FIG. 6), so that the algorithm is less sensitive to scene detail. Typically, a single "combined" sharpness score is computed, based on having weighted the "individual" sharpness variables (which are functions of distance or lens position), of several different regions of interest in the image sensor 5. The combined sharpness score is then evaluated to detect its peak; the distance or lens position that yields this peak is noted, and the lens is moved to a final distance/lens position that is based on the noted distance (when taking the picture of the scene).

In accordance with an embodiment of the invention however, rather than weighting the individual sharpness variables, the peak distances or in-focus positions, that have been computed for an autofocus zone of interest, are weighted, to directly compute the final distance. A best-fit surface is computed, and one or more points are selected from that surface, to be weighted more than the others. As an example, the selected points may be those whose (x, y) coordinates translate to a location on a touch screen viewfinder (of the autofocus camera) that the user has touched, representing the part of the scene that the user would like to appear focused in the picture.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although nine regions of interest are used in the above description, it is clear that they may be fewer or greater in number and in location, depending on the desired granularity and speed of execution of the estimation. The description is thus to be regarded as illustrative instead of limiting.

What is claimed is:

1. A method for estimating an optical characteristic, comprising:
   performing a sharpness sweep of a camera lens while capturing, using an image sensor, a plurality of digital images of an object through the lens, wherein the lens is swept in accordance with a plurality of distance-representing values, and the digital images are analyzed to calculate a respective sharpness variable for each of a plurality of different regions of interest in the image sensor;
   for each of the regions of interest, finding a peak value of the respective sharpness variable and the distance-representing value associated with the peak value;
   converting pixel coordinates of each region of interest to a pair of distance coordinates, wherein a plurality of triples are created for the plurality of regions of interest, respectively, each triple containing the associated distance-representing value and the pair of distance coordinates;
   estimating a surface to fit the plurality of triples; and
   computing a measure of the optical characteristic using the estimated surface, wherein the computed measure comprises a normal vector to the estimated surface.

2. The method of claim 1 further comprising:
   displaying the normal vector as representative of the optical characteristic being tilt.

3. The method of claim 1 further comprising:
   comparing the normal vector with a predetermined threshold and associating a pass or fail indication with the camera lens, based on the comparison.

4. The method of claim 1 wherein the distance-representing values are focal length values of the lens.

5. The method of claim 1 wherein the respective sharpness variable is specified to be a function of the distance-representing values.

6. The method of claim 1 wherein the camera lens is an autofocus lens.

7. The method of claim 6 further comprising:
   comparing the normal vector with a predetermined threshold and associating a pass or fail indication with the autofocus lens, based on the comparison.

8. The method of claim 1 wherein the estimated surface is a plane.

9. The method of claim 1 wherein the estimated surface is a plane, and said computing a measure of the optical characteristic comprises
   computing a plurality of difference values, wherein each difference value is the difference between the plane and the associated distance-representing value of a respective one of the regions of interest, and wherein the plurality of difference values are representative of the optical characteristic.

10. The method of claim 9 further comprising:
    displaying the difference values as representative of the optical characteristic being curvature of field.

11. The method of claim 9 further comprising:
    plotting a first plurality of points, each being based on a respective one of the difference values, against one of the pair of distance coordinates of the respective region of interest; and
    plotting a second plurality of points, each being based on the respective one of the plurality of difference values, against the other one of the pair of distance coordinates of the respective region of interest.

12. The method of claim 11 further comprising:
    drawing first and second curves to fit the first and second plurality of points, respectively, wherein the first and second curves are representative of the optical characteristic being curvature of field.

13. The method of claim 9 further comprising:
    using the plurality of difference values to determine the degree of defocus in a given region of interest.

14. A method for estimating an optical characteristic of an autofocus lens, comprising:
    sweeping the autofocus lens while capturing, using an image sensor, a plurality of digital images of an object through the lens, wherein the autofocus lens is swept in accordance with a plurality of autofocus actuator driver values;
    analyzing the digital images to calculate a respective sharpness variable for each of a plurality of different regions of interest of the image sensor;
    for each of the regions of interest, finding a peak value of the respective sharpness variable and the autofocus actuator driver value associated with the peak value;
    for each of the regions of interest, converting the associated driver value to an associated lens displacement value, and converting pixel coordinates of each region of interest to a pair of distance coordinates, wherein a plurality of triples are created for the regions of interest, each triple containing the associated lens displacement value and the pair of distance coordinates;

estimating a surface to fit the plurality of triples; and computing a measure of the optical characteristic of the autofocus lens using the estimated surface, wherein the computed measure comprises a normal vector to the estimated surface.

15. The method of claim 14 further comprising:

comparing the normal vector with a predetermined threshold and associating a pass or fail indication with the autofocus lens, based on the comparison.

16. The method of claim 14 wherein the autofocus lens is part of a digital camera module.

17. The method of claim 14 wherein the respective sharpness variable is a function of the driver values.

18. A method for estimating an optical characteristic, comprising:

performing a sharpness sweep of a camera lens while capturing, using an image sensor, a plurality of digital images of an object through the lens, wherein the lens is swept in accordance with a plurality of distance-representing values, and the digital images are analyzed to calculate a respective sharpness variable for each of a plurality of different regions of interest in the image sensor;

for each of the regions of interest, finding a peak value of the respective sharpness variable and the distance-representing value associated with the peak value;

converting pixel coordinates of each region of interest to a pair of distance coordinates, wherein a plurality of triples are created for the plurality of regions of interest, respectively, each triple containing the associated distance-representing value and the pair of distance coordinates;

estimating a surface to fit the plurality of triples, wherein the estimated surface is a plane; and computing a measure of the optical characteristic using the plane, wherein said computing the measure of the optical characteristic comprises computing a plurality of difference values, wherein each difference value is a difference between the plane and the associated distance-representing value of a respective one of the regions of interest.

19. The method of claim 18 further comprising:

displaying the difference values as representative of the optical characteristic being curvature of field.

20. The method of claim 18 further comprising:

plotting a first plurality of points, each being based on a respective one of the difference values, against one of the pair of distance coordinates of the respective region of interest; and plotting a second plurality of points, each being based on the respective one of the plurality of difference values, against the other one of the pair of distance coordinates of the respective region of interest.

21. The method of claim 20 further comprising:

drawing first and second curves to fit the first and second plurality of points, respectively, wherein the first and second curves are representative of the optical characteristic being curvature of field.

22. The method of claim 18 further comprising:

using the plurality of difference values to determine the degree of defocus in a given region of interest.

23. The method of claim 18, wherein the computed measure comprises a normal vector to the estimated surface.

\* \* \* \* \*